June 13, 1950      R. J. KINNEY      2,511,347

TIMING DEVICE

Filed June 16, 1944

Inventor:
Robert J. Kinney,
by Spear Rawlings & Spear
Attorneys

Patented June 13, 1950

2,511,347

UNITED STATES PATENT OFFICE 2,511,347

TIMING DEVICE

Robert J. Kinney, Portland, Maine

Application June 16, 1944, Serial No. 540,596

6 Claims. (Cl. 99—336)

My present invention relates to a novel timing device for use in cooking or the like.

Several proposals have been made to provide a timing device in which the article or articles, generally eggs, being heated were raised from the water by means of a weighted element rendered operable by the flow of water to or from a container so that the weight of the articles became overbalanced by the weighted element. In such proposals, variations in the timing resulted from either changing the position of a weight or by varying the volume of the water.

These devices, while based on a principle making possible a simple and inexpensive construction, were not acceptable. A basic difficulty with these proposals was that their operation was premised on a predetermined egg weight so that with a change in sizes or in numbers, accuracy of timing was impossible.

In accordance with my invention, I provide a timing device well adapted, for example, to time accurately the cooking of eggs without regard to their size or number, provided, of course, that the total weight is not in excess of a predetermined maximum weight. A timing device, in accordance with my concept, comprises a standard to which an arm is pivotally supported so that one end extends over the cooking vessel. The other end of the arm serves as a guideway along which a weight may move under the influence of gravity. On the first named end of the arm, I mount a water container which, when filled to a predetermined level, overbalances the weight and from which the water escapes to provide a timing means. When the water filled container is in control of the arm, the weight is urged by gravity towards the standard into a predetermined position, but when the water has escaped to permit the weight to tilt the arm, gravity urges the weight outwardly or away from the standard and the leverage effect of the weight increases sharply.

The receptacle for the eggs is connected to the first named end of the arm and until the weight moves outwardly under the influence of gravity, the receptacle is supported entirely by the cooking vessel. As the weight moves outwardly, its leverage effect increases sharply so that the weight is well adapted to elevate the receptacle and its contents from the cooking vessel. Variations in the timing may be controlled as by providing adjustable stops to vary the position of the weight relative to the standard. In all such positions, the weight is overbalanced by the water filled container for desired intervals after which the weight becomes effective to raise any load up to a predetermined maximum.

I am thus able to provide simple and inexpensive timing devices adapted to time accurately cooking or other operations.

In the accompanying drawings, I have shown an illustrative embodiment of my invention from which its several novel features and advantages will be readily apparent.

Figure 1:
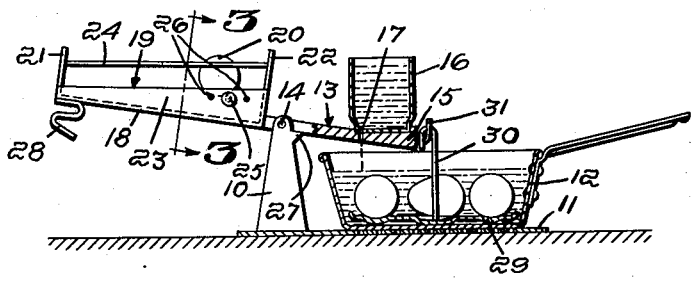
Fig. 1 is a partly sectioned view showing the device in operation.
Figure 2:
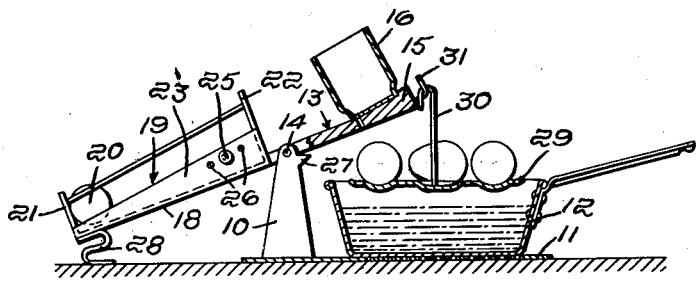
Fig. 2 is a view, similar to Fig. 1, showing the relation of the parts at the end of the timed interval.
Figure 3:
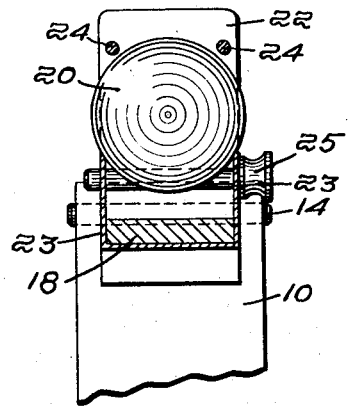
Fig. 3 is an enlarged fragmentary section along the lines 3—3 of Fig. 1.

In accordance with my invention, I use a standard 10 preferably having a perforate base 11 to receive vessels, such as the cooking vessel 12, of different sizes. An arm, generally at 13, is pivotally supported as at 14 by the standard 10 with one end portion 15 disposed over the vessel 12.

Mounted on the end 15 of the arm 13 is a container 16 adapted to be filled to a predetermined level with water. The container 16 has a restricted outlet 17 so that when filled with water it serves as a timing element.

The other end portion 18 of the arm 13 is formed to establish a guideway generally indicated at 19 for the weight 20 shown in the form of a ball. The guideway may conveniently consist of ends 21 and 22 and sides 23 secured thereto and to the end portion 18. As shown, the sides 23 serve to establish a ramp inclined downwardly towards the standard 10 when the arm 13 is in a predetermined position under the influence of the weight of the container 16 and its contents so that the weight 20 is urged by gravity towards the standard 10. Guides 24 attached to the ends 21 and 22 serve to hold the weight in position on the sides 23. Stop means are employed to limit the movement of the weight 20 towards the standard 10 when the arm 13 is substantially in its horizontal position. Such stop means may conveniently comprise a pin 25 insertable through any pair of transversely alined holes 26 located to provide different cooking intervals. While timing may be effected by varying the column of water in the container 16, the use of adjustable stop means is preferred.

When the container 16 is filled with water, it overbalances the weight 20 when in any of its predetermined positions established by the stop means. At 27, I have indicated a stop limiting the pivoting of the arm 13 under the influence of the container 16, while I have shown at 28 a stop, conveniently an S-shaped spring, attached to the end of the arm portion 18, to provide a resilient stop for the arm 13 when under the influence of the weight 20.

A receptacle 29 for one or more eggs is attached to the arm end 15 by a support 30 connected to a hook 31 on the arm end 15 to permit limited independent movement of the arm 13 relative thereto.

When the container 16 is filled with water, it overbalances the weight 20 regardless of the position established for it by the stop means and the receptacle 29 is supported solely by the bottom of the vessel 12. As the water escapes from the container 16, it loses its capacity to overbalance the weight 20 at the end of an interval determined by the position of the weight 20 on the guideway 19. As the weight 20 assumes control of the arm 13, the arm 13 is pivoted until the weight may roll outwardly along the guideway 19 under the influence of gravity. Because of limited independent movement of the arm 13 relative to the receptacle 29 ensured by the connection between the support 30 and the hook 31, the initial tilting of the arm 13 to permit the weight 20 to move outwardly does not affect the receptacle 29. As the weight 20 moves outwardly, its leverage effect increases suddenly to be ample to raise the receptacle from the cooking water.

In accordance with my invention, I am thus able to provide a simple and inexpensive device well adapted to accurately control the time of cooking or like operations regardless of variations in the weight or number of the objects being treated.

What I therefore claim and desire to secure by Letters Patent is:

1. A timing device for use in cooking eggs or the like in a vessel, said device comprising a standard, an arm, pivot means connecting said arm to said standard, a liquid container on one end of said arm including an outlet port to enable the liquid to escape therefrom at a predetermined rate, the other end of said arm including a track, a weight having a smooth curved surface of regular contour adapted to roll freely along said track, means maintaining said weight in contact with said track so that it may roll therealong between an inner position and an outer position, said weight when in said inner position being overbalanced by said container when filled with a predetermined volume of liquid, said track being so disposed that when said weight is overbalanced, said weight is maintained by gravity in said inner position, a receptacle for the eggs beneath said container, and a loose connection between said receptacle and said container supporting end of said arm to enable said receptacle to be supported solely by the bottom of said vessel and to establish such relative movement between said receptacle and said arm that when a predetermined volume of liquid has escaped from said container, said weight becomes operative to so tilt said arm that said weight rolls outwardly therealong until increased leverage enables said weight to raise said basket and its contents from said vessel.

2. The timing device of claim 1 in which the means maintaining the weight in contact with the track comprise a pair of end members, and a pair of spaced members interconnecting the end members and spaced from the track to accommodate the weight member so that it may roll freely along the track.

3. The timing device of claim 2 in which the limiting means holds the arm in predetermined position when the weight is overbalanced, and the track is inclined relative to the arm downwardly towards the pivot means so that when the arm is in that predetermined position, the weight is urged by gravity towards the pivot means.

4. The timing device of claim 1 in which the track comprises a pair of uprights connected to the arm and having a plurality of transversely alined apertures adjacent the pivot means and intersecting the path of the weight member, and a pin insertable through any transversely alined apertures to establish the inner position of the weight member.

5. The timing device of claim 1 in which the weight is a single spherical member.

6. A timing device for use in cooking eggs or the like in a vessel, said device comprising a standard, an arm, pivot means connecting said arm to said standard, a liquid container on one end of said arm and including an outlet port to enable the liquid to escape therefrom at a predetermined rate, the other end of said arm including a track, a weight having a smooth curved surface of regular contour adapted to roll freely along said track when inclined, stops adjacent each end of said track, and guide means to maintain said weight in operative relation to said track, said weight, when in a position adjacent said pivot means, being overbalanced by said container when filled with a predetermined volume of liquid, means to limit the extent to which said arm may be tilted by said container when thus filled, said track being so disposed that when said arm is in engagement with said limiting means, said weight is maintained by gravity in said overbalanced position, a receptacle for the eggs immediately beneath said container, and a loose connection between said receptacle and said container supporting end of said arm to enable said receptacle to be supported solely by the bottom of said vessel and to establish such relative movement between said receptacle and said arm that when a predetermined volume of liquid has escaped from said container, said weight becomes operative to so tilt said arm that said weight rolls outwardly therealong until increased leverage enables said weight to raise said basket and its contents from said vessel.

ROBERT J. KINNEY.

REFERENCES CITED

The following references are of record in the file of this patent:

UNITED STATES PATENTS

| Number | Name | Date |
|---|---|---|
| 670,296 | Richardson | Mar. 19, 1901 |
| 1,297,180 | Kilbourne | Mar. 11, 1919 |
| 1,387,357 | Corbett | Aug. 9, 1921 |